United States Patent [19]

Natt et al.

[11] 4,033,879

[45] July 5, 1977

[54] CENTRIFUGE, ESPECIALLY SUGAR CENTRIFUGE

[75] Inventors: Peter Natt, Braunschweig; Heinrich Kurland, Lucklum, both of Germany

[73] Assignee: Braunschweigische Maschinenbauanstalt, Braunschweig, Germany

[22] Filed: July 15, 1975

[21] Appl. No.: 596,182

[30] Foreign Application Priority Data

July 26, 1974 Germany .......................... 2436044

[52] U.S. Cl. .................................. 210/369; 127/56; 210/380 R

[51] Int. Cl.² .......................................... B01D 33/02

[58] Field of Search ........... 210/360 R, 360 A, 361, 210/369, 371, 380 R, 377–379; 233/46; 127/19, 56

[56] References Cited

UNITED STATES PATENTS

| | | | |
|---|---|---|---|
| 698,332 | 4/1902 | Siedel | 233/46 |
| 1,749,368 | 3/1930 | Behr | 210/378 X |
| 2,759,609 | 8/1956 | Williams | 210/361 |
| 3,225,934 | 12/1965 | Van Riel | 210/377 X |
| 3,226,257 | 12/1965 | Steele et al. | 210/369 X |
| 3,238,063 | 3/1966 | Steele | 210/369 X |
| 3,256,993 | 6/1966 | Siepe et al. | 210/378 X |
| 3,302,794 | 2/1967 | Laven | 210/369 |
| 3,437,209 | 4/1969 | Evans | 210/377 X |

*Primary Examiner*—Frank W. Lutter
*Assistant Examiner*—Richard L. Chiesa
*Attorney, Agent, or Firm*—W. G. Fasse; W. W. Roberts

[57] ABSTRACT

The present centrifuge is especially adapted for centrifuging massecuite in the production of sugar. Two functional and structural units are separated from each other in such a manner that each unit may be supported independently of the other unit, yet so as to properly cooperate with each other. Thus, an inner housing and the rotating drum with the drive means for the drum form an inner, integral unit while an outer housing and a cover as well as the massecuite supply means form a further, outer integral unit. A carrier member, preferably in the form of a hollow channel, extends from the inner housing through the outer housing to support the drum drive means outside of the outer housing, but as part of the inner unit.

10 Claims, 2 Drawing Figures

Fig. 2 (A-B)

CENTRIFUGE, ESPECIALLY SUGAR CENTRIFUGE

BACKGROUND OF THE INVENTION

The present invention relates to a continuously operable or operating centrifuge, especially to a sugar centrifuge having a vertical drive shaft extending through the bottom of the drum upwardly and further having a drive motor arranged laterally adjacent to the entire centrifuge, whereby the drum is surrounded by a housing providing separate collecting chambers for the flow-off liquid, as well as for the wash liquor and a further separate chamber for the solid components arranged between an inner housing and an outer housing.

Prior art centrifuges of this type are available in different embodiments and are constructed in several sizes, depending upon the throughout capacity per unit of time. Such centrifuges comprises a housing which is rigidly connected to a drum supporting base plate, whereby separation walls in the housing provide separate collection chambers for the flow-off liquid as well as for the so called wash liquor, and for the solid components. The drum supporting base plate and the housing connected to the base plate are supported on the floor by spring means, thus forming a unit which may vibrate as an integral structure.

The construction of such centrifuges causes substantial problems especially where large dimensions must be accommodated for achieving large throughput capacities. In this connection the mass of the vibrating system increases corresponding to the increasing dimension of the centrifuge. The mass increase is caused to a substantial extent by the stiffening means for the housing which are necessary to avoid resonance oscillations and shimmying, which might otherwise occur as a result of said vibrating movements. Further, the lateral arrangement of the drive motor requires cost increasing structural features, especially as the dimension of the centrifuge increases, because a rather stable or sturdy supporting structure for the motor is necessary.

OBJECTS OF THE INVENTION

In view of the above, it is the aim of the invention to achieve the following objects singly or in combination:

to construct a centrifuge of the type described above in such a manner that the above drawbacks are avoided, especially that the production costs are reduced and the motor supporting means are substantially simplified, whereby the entire assemblying of the centrifuge including the housing shall be substantially facilitated;

to provide a centrifuge structure which will reduce construction costs even for centrifuges of large dimensions and large throughput capacities, whereby the required large housing dimensions for containing the solid components, as well as the liquids shall be achieved by simple expedients;

to construct a sugar centrifuge in such a manner that two integral but separate units may be supported independently of each other, whereby a relatively large outer housing may now be employed to provide an increased containing capacity for the centrifuged solid components, whereby simultaneously clogging, for example, by bridge formations and the like in the solid components collection spare are substantially prevented;

to provide means which will reduce the foam formation;

to provide simple means which simultaneously support the drum drive motor outside an outer housing and which also constitute duct means for the removal of the flow-off liquid and the wash liquor; and to construct the massecuite supply or filler means in such a manner that these means cannot participate in any vibrations of the centrifuge drum.

SUMMARY OF THE INVENTION

According to the invention there is provided a centrifuge, especially for use in the production of sugar, wherein the drum is connected to a base plate, and surrounded by an inner housing which is separate from an outer housing. A carrier is connected at one end thereof to the inner housing and extends with its outer or opposite end through the outer housing, whereby the drum drive motor is supported on the carrier to form an integral unit with the drum and the inner housing as well as the carrier, whereby the latter preferably reaches down to the level of a supporting floor or foundation. The outer housing forms with a cover member and with a filling device for the massecuite a second functional and structurally integral unit, which is insulated from any vibrations of the first mentioned unit, including the drum and the drive means, as well as the inner housing. The second outer unit is rigidly secured to the floor or a foundation and the carrier for the drum drive motor extends through the outer housing. A solids collecting chamber is formed between the inner housing and the outer housing. Two separate liquid collecting chambers are formed by separation walls in the inner housing.

In the centrifuge according to the invention a unitary integral structure is formed comprising the drum and the inner housing as well as the support or base plate and the carrier for the motor drive means. Preferably the carrier is a channel or tubular member so that liquid conduit means as well as the drive connecting means may extend through the channel member preferably through separate ducts. In any event, the just enumerated integral structure may be prefabricated even with rather very large dimensions and the prefabricated structure may be transported as a unit. The just mentioned integral inner unit so to speak is supported by spring means on the ground or on a foundation. The outer structural unit comprising the outer housing is insulated from the inner structure against vibration and is supported separately on the ground of a foundation. Thus, the outer unit cannot participate in any oscillations or vibrations, which might occur in the inner unit due to unbalances or the like.

As mentioned, the inner housing forms the liquid collecting chambers while the solids are collected in the chamber formed between the inner and outer housings. The tubular or channel carrier for the motor extends in such a manner through the outer housing that the drum and the inner housing, as well as the motor preferably secured by a motor bracket to the outer end of the carrier may vibrate relative to the outer housing. This separation according to the invention of an inner unit from the outer unit now permits the use of relatively large outer housings, which may be manufactured and transported separately. This feature provides a substantially increased containing capacity for the centrifuged solids. In addition, this feature prevents or substantially reduces clogging which heretofore resulted due to bridge formations and the like in the solids collecting chamber. Morevoer, it is now possible to manufacture the outer housings as a relatively light structure, because the outer housing does not participate in the vibrations of the drum and the drum drive means. Thus, the outer housing is not required to take up the loads and forces which result from such vibrations.

BRIEF FIGURE DESCRIPTION

In order that the invention may be clearly understood, it will now be described, by way of example, with reference to the accompanying drawings, wherein:

FIG. 1 is a sectional view of a centrifuge according to the invention, wherein the section extends vertically through the longitudinal rotational axis of the centrifuge; and FIG. 2 is a sectional view along the section line AB in FIG. 1.

DETAILED DESCRIPTION OF EXAMPLE EMBODIMENTS

Figure 1:
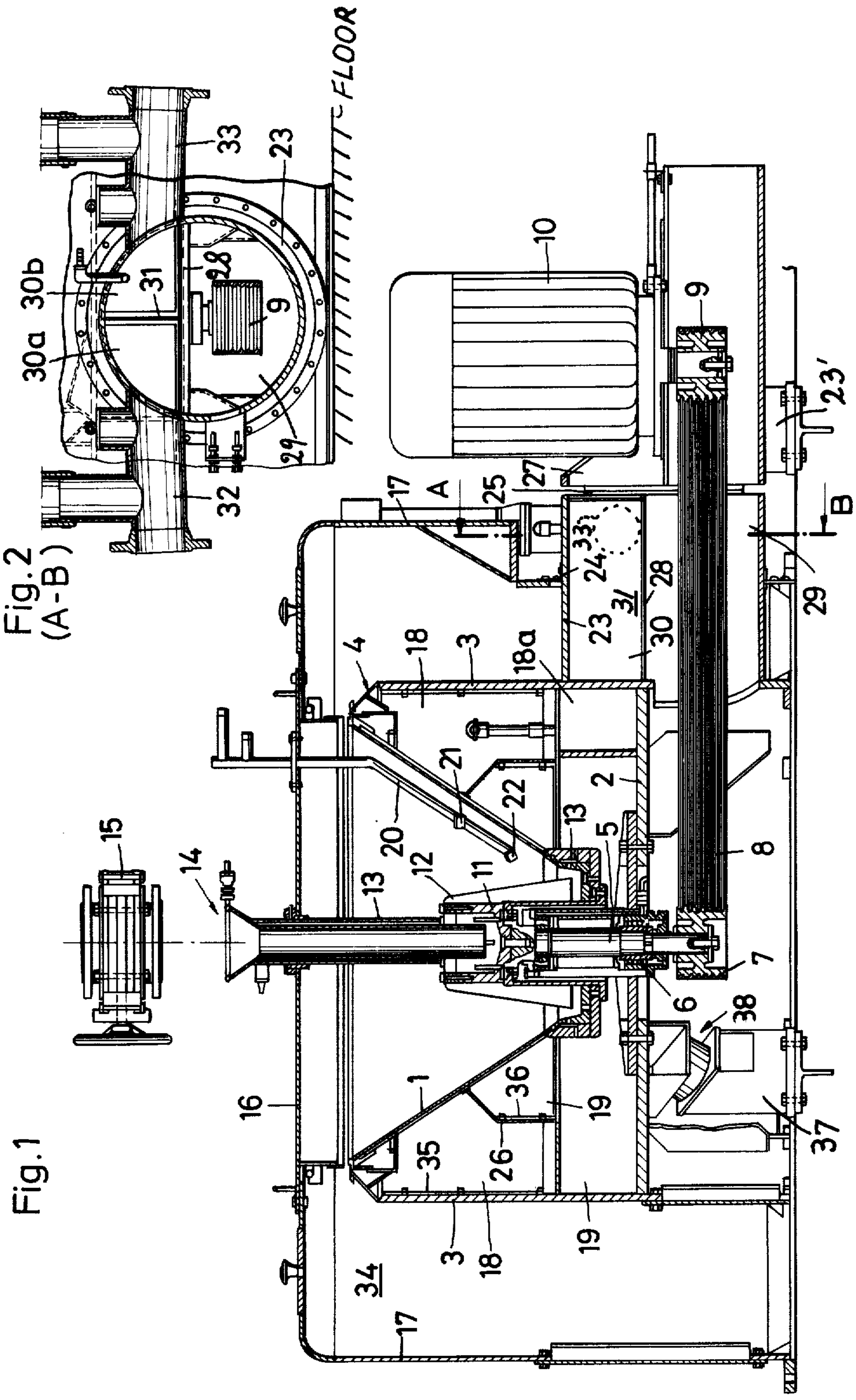

As shown in FIG. 1, the centrifuge drum 1 is supported for rotation on a supporting base plate 2, which forms simultaneously the bottom of the inner housing 3. Adjacent to the upper edge of the inner housing 3 there are arranged around the outflow end of the drum end baffle or guide plates 4. These baffle plates 4 guide the air and form a labyrinth seal extending between the upper drum edge and the inner housing 3.

More specifically, the drum 1 is supported on a drive shaft and cannot rotate relative to the shaft 5. The drive shaft 5 in turn extends through the base plate 2 and is rotatably supported in bearings 6. A pulley 7 is rigidly secured to the lower end of the drive shaft 5. The pulley 7 is connected to a further pulley 9 by V-belt means 8. The pulley 9 is secured to the shaft of the drive motor 10.

The upper end of the drive shaft 5 extending into the drum 1 carries a so called filling pot 11 which in turn is surrounded by an acceleration cone 12 reaching downwardly into an acceleration pan 13, the latter forming the bottom or closure of the drum 1. The acceleration cone 12 is provided with a central bore at its top. A pipe 13 of a filling device 14 extends through said central bore of the acceleration cone 12. The filling or loading device 14 is supported in a cover member 16 which closes an outer housing 17. A massecuite valve 15 is arranged in axial alignment above the filling device 14.

The inner housing 3 is partitioned in two separate collecting chambers 18 and 19 to receive the liquids which are centrifuged through the perforated jacket of the drum 1. The liquid collection chamber 19 extends around the entire lower section of the drum 1 in which the liquid component of the massecuite is centrifuged. The collection chamber 18 extends around the entire upper section of the drum 1 in which the so called wash liquor is centrifuged to be collected in the chamber 18. The wash liquor is supplied by means of pipes 20 extending through the cover 16 into the inside of the drum. The pipes 20 are provided with spray-on nozzles 21 and 22.

FIG. 1 illustrates that the liquid collecting chamber 19 extends downwardly to the base plate 2, while the other liquid collecting chamber 18 communicates with a downwardly extending section 18*a* also reaching down to the base plate 2. The downwardly extending portion or section 18*a* of the collecting chamber 18 further communicates with liquid removal ducts in the same manner as the lower portion of the chamber 19. The details of the liquid removal will be described in more detail below.

A separation wall 26 separates the collecting chambers 18 and 19 from each other. The collecting wall 26 reaches upwardly to a level corresponding substantially to one half of the height of the drum. The lower portion of the separation wall 26 extends substantially vertically and as a ring around the drum. The upper portion of the separation wall 26 is slanted toward the drum and reaches to a point immediately adjacent to the drum without interfering with the drum rotation.

In the lower right-hand portion of FIG. 1 there is illustrated a carrier 23 rigidly secured to the inner housing 3, for example, by welding or the like. In the preferred embodiment the carrier 23 is a channel member which extends through a respective opening in the outer housing 17. The drive motor 10 is secured to the outer or free end of the carrier channel 23, for example, by means of a motor bracket 27. The opening and passage through the outer housing 17 is sufficiently large so that the carrier 23 may freely pass therethrough and so that vibrations of the carrier 23 will not be transmitted to the outer housing 17, which is rigidly supported on the floor or foundation. A sealing sleeve 24 of elastically yielding material, such as rubber is arranged to cover the gap between the carrier 23 and the outer housing 17. The motor bracket 27 may, for example, be connected to the outer end of the carrier 23 by means of a flange 25, whereby the latter may close the outer end of the carrier, if the carrier is a pipe or channel member. The carrier 23 extends downwardly substantially to the floor or the foundation of the centrifuge, as may also be seen in FIG. 2. If desired, supporting legs 23' may be provided to secure the carrier 23 or its extension in the form of the motor bracket 27 to the floor or foundation.

The carrier channel 23 is separated into upper duct means and lower duct means by a longitudinally extendng horizontal separation wall 28. The lower duct 29 provides space for the drive connecting means, for example, the V-belts 8. The upper duct 30 provides an outflow connection for the liquids from the collecting chambers 18 and 19. For this purpose, the upper duct 30 is further divided by a longitudinally extending vertical wall 31, thus providing two separate ducts 30*a* and 30*b*. One duct 30*a* communicates with the liquid collection space 19. The other duct 30*b* communicates with the liquid collection chamber 18 through the chamber section 18*a*. Pipes 32, 33 are communicating with the respective individual ducts 30*a* and 30*b* in order to provide outflow ports for the liquids collected in the chambers 18 and 19.

In view of the just described features of the carrier 23, it will be appreciated that the latter not only provides a simple supporting means for the motor bracket 27, thus carrying the drive motor 10, but it also serves for two other functions; namely, by forming a lower channel 29 and two separate upper channels 30*a* and 30*b* means are provided for safely interconnecting the motor 10 and the drive shaft 5 since the V-belts 8 are protected in the channel 29, and for permitting the outflow of the liquids collected in the chambers 18 and 19. The upper channels 30*a* and 30*b* are closed by the flange 25 connecting the motor bracket 27 to the outer end of the carrier channel 23. Thus, the carrier means serve for a plurality of purposes in an especially simple manner.

In the light of the above description, it will also be appreciated that the centrifugal drum 1 and the base plate 2 form an integral functional and structural unit including the inner housing 3 and the carrier channel 23, as well as the motor bracket 27 and the drive motor 10. This structural unit is supported by legs 37 secured on the one hand to the floor or the foundation and connected through spring means 38 to the base plate 2. A plurality of such spring supported legs 37, 38 may be arranged between the floor and the base plate 2. The spring supported legs 37, 38 permit the just described unit to vibrate in response to unbalances or the like.

The outer housing 17 with its cover 16 and the massecuite supply device 14 are supported separately, that is, independently of the first mentioned unit. Thus, the second mentioned unit comprising the outer housing 17, the cover 16, and the filling device 14 do not participate in the vibrations of the inner unit. To this end the carrier channel 23 is insulated from the outer housing by the elastically yielding sealing sleeve 24, which is simply mounted and permits the separate prefabrication of the inner unit and the outer unit. These units may be correspondingly simple in their construction and their assembly is substantially facilitated by the combined features of the invention.

The space 34 between the inner housing 3 and the outer housing 17 serves as a collecting chamber for the solids, which are centrifuged over the upper edge of the centrifuged drum 1. The advantage of employing an outer housing 17 is especially seen in the fact that the outer housing may have large dimensions in order to provide a substantial containing capacity depending upon the particular requirements of any individual situation. In any event, the outer housing 17 may be dimensioned so that clogging of the solids collecting chamber is avoided. In the described example the solids are sugar and the large dimensions of the outer housing 17 prevent or substantially reduce any clogging of the sugar and facilitate its removal.

Heretofore difficulties have been encountered especially in connecting with large dimensions centrifuges, because the liquid collection and liquid removal involved a substantial foaming, especially in connection with sugar centrifuges. Such foaming occurs especially when the liquid impinges upon the walls of the collecting chambers, whereby it has been found according to the invention that in sugar centrifuges the extent of foaming differs for the centrifuged syrup and the centrifuged wash liquor.

According to the invention this foaming problem has been solved by providing the collecting chambers 18 and 19 with double walls of which the inner wall members are provided in the form of screens or sieves 35, 36. These inner wall screens 35, 36 face inwardly, that is, toward the central axis of the drum 1 and in the simplest embodiment these wall members may be perforated sheet metal extending at least along a portion of the height of the separation wall 26 and the outer wall of the inner chamber 3. These double walls or rather the perforated inner wall members 35, 36 provide flow channels greatly facilitating the removal of the centrifuged liquid including the foam, toward the bottom of the respective collection chamber, whereby even a partial foam destruction has been observed. It is believed that this effect is due to the cooperation between the perforated inner wall members 35, 36 and the centrifugal drum 1, which creates a circulatory movement in the just described flow channels. Thus, it is a substantial advantage of this particular feature of the invention that the foam production has been reduced and that the removal of whatever foam is still being formed has been substantially improved.

The spacing between the inner perforated wall members or screens 35, 36 and the respective wall will depend on the circumstances, however, a spacing of .10 mm has been found to be satisfactory. In any event, the screens 35, 36 should cover those wall portions upon which the larger proportion of the centrifuged liquid impinges. Especially the foam destruction achieved by this feature of the invention of the invention is of great advantage, particularly for assuring a fault-free operation of large dimension centrifuges, specifically in the sugar industry.

Although the invention has been described with reference to specific example embodiments, it will be appreciated, that it is intended to cover all modifications and equivalents within the scope of the appended claims.

What is claimed is:

1. A centrifuge comprising a first unit and a second unit, said first unit comprising a base plate, spring support means for said base plate, drum means, means rotatably securing said drum means to said base plate while inhibiting nonrotational movement therebetween, said securing means including a drive shaft rotatably supported by and vertically extending through said base plate and rigidly secured to said drum, inner housing means supported by said base plate and surrounding said drum to form collecting chamber means around said drum for receiving liquid centrifuged from the drum, carrier means having an inner end rigidly secured to said inner housing and an outer end extending laterally away from said inner housing, motor means rigidly supported by said outer end of the carrier means, and means operatively connecting said motor means to said drive shaft for rotating said drive shaft, said spring support means operatively supporting said first unit independently of said second unit, said second unit comprising an outer housing separated from said inner housing, said outer housing being mounted to surround said inner housing to form an enclosed space around said inner housing to receive solid materials from said drum means, cover means for said outer housing, and material filling means extending through said cover means into said drum means, said carrier means extending through said outer housing.

2. The centrifuge according to claim 1, wherein said inner housing comprises rigid ring shaped partition means to form two collecting chambers in said inner housing, said inner and outer housing comprising walls defining a solids collecting chamber, and liquid outlet means operatively connected to said separate liquid collecting chambers.

3. The centrifuge according to claim 2, further comprising screen means secured to and spaced from said inner housing on an inwardly facing side of said inner housing, as well as further screen means secured to and spaced from said ring shaped partition means also on an inwardly facing side of said partition means.

4. The centrifuge according to claim 2, wherein said carrier means are constructed as channel means, said outlet means extending through said channel means.

5. The centrifuge according to claim 4, wherein said channel means include wall means longitudinally separating said channel means into a plurality of separate ducts, said connecting means for said motor means and said drive shaft extending through one of said plurality of ducts, said liquid outlet means being formed by another of said plurality of ducts.

6. The centrifuge according to claim 5, wherein said plurality of ducts comprises three ducts, whereby two ducts are connected to said separate liquid collecting chambers, and whereby the third duct contains said connecting means for said motor means and said drive shaft.

7. The centrifuge according to claim 6, wherein said two ducts are arranged side by side and above the third duct.

8. The centrifuge according to claim 1, wherein said carrier means comprise bracket means secured to said outer end thereof, said bracket means supporting said motor means as part of the first unit.

9. The centrifuge according to claim 8, wherein said carrier means are formed as channel means, including a plurality of ducts extending laterally outwardly of said inner housing, said bracket means being positioned to close the outer ends of at least certain of said ducts.

10. The centrifuge according to claim 1, wherein said inner housing surrounds said base plate, and wherein said carrier means comprise at least one support member extending downwardly to a level corresponding to a foundation or floor.

* * * * *